United States Patent [19]

Strenglein

[11] 3,864,633

[45] Feb. 4, 1975

[54] ANGLE DIVERSITY COMMUNICATION SYSTEM

[75] Inventor: Harry F. Strenglein, Clearwater, Fla.

[73] Assignee: Sperry Rand Corporation, New York, N.Y.

[22] Filed: Aug. 23, 1972

[21] Appl. No.: 283,242

[52] U.S. Cl. .......... 325/304, 325/56, 325/65

[51] Int. Cl. .......... H04b 1/10, H04b 7/02

[58] Field of Search .......... 325/82, 56, 65, 30–306, 325/366–367, 369, 300, 307, 3, 14; 343/205, 206

[56] References Cited

UNITED STATES PATENTS

| | | | |
|---|---|---|---|
| 2,448,866 | 9/1948 | Crosby | 325/304 |
| 2,587,590 | 3/1952 | Brewer | 325/56 |
| 2,951,152 | 8/1960 | Sichak et al. | 325/305 |
| 3,189,820 | 6/1965 | Lowman | 325/369 X |
| 3,593,147 | 7/1971 | Gurak et al. | 325/305 |
| 3,633,107 | 1/1972 | Brady | 325/305 |
| 3,641,437 | 2/1972 | Gurak et al. | 325/305 |
| 3,652,939 | 3/1972 | Levasseur | 325/65 |

*Primary Examiner*—Benedict V. Safourek
*Assistant Examiner*—A. M. Psitos
*Attorney, Agent, or Firm*—Howard P. Terry

[57] ABSTRACT

A space diversity communication system is presented in which the effects of signal fading are reduced through the cooperative receipt by closely spaced antenna sensor elements and the processing in a hybrid network of signals originally transmitted as a single intelligence-modulated carrier, though susceptible of multiple path propagation. Sum and difference signals are developed for analysis in a novel diversity signal selector or combiner. In one form, the latter may develop signals for electronically steering the system receptivity pattern so as to maximize the reception signal-to-noise ratio.

15 Claims, 8 Drawing Figures

ANGLE DIVERSITY COMMUNICATION SYSTEM

BACKGROUND OF THE INVENTION

1. Field of the Invention

The invention pertains to means for directive high frequency communication between geographic points with reduced loss of communication due to fading and related effects. More particularly, the invention concerns space or angle diversity signal translating or combining means for employment at a communication receiver station for substantially reducing the effects of signal fading due to atmospheric ducting and such effects.

2. Description of the Prior Art

Prior art arrangements for combating signal fading in high frequency relays or other communication links involve making the received signal-to-noise ratio many decibels higher than necessary under the normal or non-fading circumstances or more often resort to the use of one or the other of two available types of diversity reception.

The method of diminishing the consequences of fading by increasing the received signal-to-noise ratio has several marked disadvantages. The result may be achieved by raising the transmitter power operating level at the expense of increased initial and operating cost for the transmitter. Increasing power level undesirably raises the probability of causing disturbing interference, for example, at distant terminals in other links of the relay system through atmospheric ducting. Generally, to prevent these and other interference situations, government regulations restrict power transmission levels. For remotely located relay stations and for many portable stations, the increased power supply requirements are particularly objectionable.

In prior art diversity reception schemes for reducing the effects of fading, frequency and space diversity methods have been used. Both methods may provide techniques by which the best of several possible received signals is selected and used. In frequency diversity, duplicate messages are transmitted simultaneously on two or more high frequency carrier signals. Because the wave lengths and space attenuation effects are different for the several carrier frequencies, the probability of very deep fading of all of the carriers at any one instant is reduced. A diversity combiner or signal selector is then employed, for example, automatically to inspect all carrier signals and to select for use the one with the greatest signal-to-noise ratio. While frequency diversity systems work well in practice, they are inherently wasteful of the high frequency spectrum. They are therefore currently illegal for many applications. Furthermore, frequency diversity systems require considerable equipment and are therefore undesirably expensive to install and to operate.

Space or angle diversity methods involve the transmission by a single transmitter of a message on a single high frequency carrier diversity reception is practiced at the receiver. Two or more receiving antennas with associated reflectors spaced apart vertically by 30 to 40 feet are often employed. The phase relationships between direct and reflected paths differ considerably at each receiver antenna location, and the probability of simultaneous fading at each receiver antenna is therefore reduced.

On the other hand, the spaced diversity reception method is objectionable because of the increased support tower height required and its consequent high cost, an objection of great consequence for portable relay stations. On the basis of installation cost alone, the extra antenna reflectors and feeds and extra tower height are worth avoiding, if possible. While both frequency and space diversity methods have significantly reduced communication failures caused by signal fading, additional improvement is demanded as information communication rates are increased.

SUMMARY OF THE INVENTION

The present invention relates to angle or space diversity communication systems and to diversity selection or combining apparatus including hybrid networks for reduction of effects due to signal fading. The reduction in fading is achieved using cooperating closely spaced receiver antenna sensor elements for collection of signals that are processed by a hybrid network for the development of sum and difference signals for use in a novel diversity signal translator in the form of a selector or combiner. The translator is adapted to supply useful communication receiver output signals substantially devoid of fading. In addition, the system develops signals for automatically steering the receptivity pattern of the receiver antenna so that signal reception is maximized.

DESCRIPTION OF THE PREFERRED EMBODIMENTS

Figure 1:
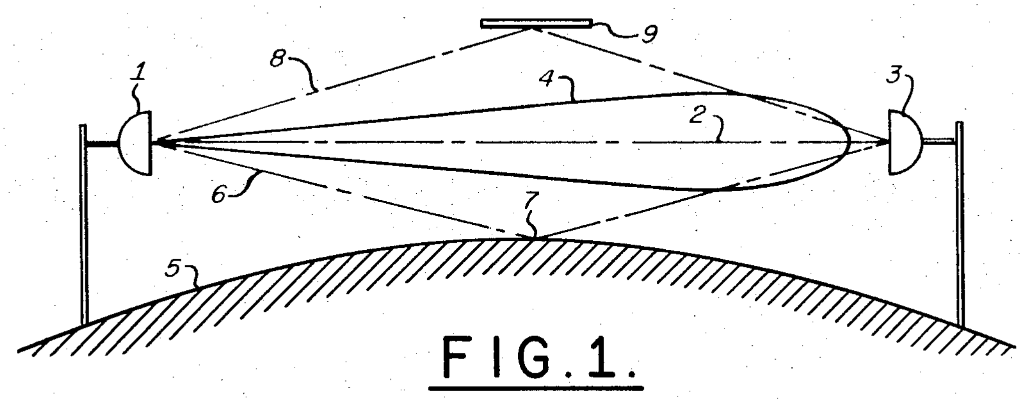
FIG. 1 is an elevation view of a communication system useful in explaining operation of the invention.

FIG. 1 illustrates the geometry of a typical high frequency or microwave communication situation involving a tower-supported directive transmitter antenna 1 for propagating information-modulated signals along a path 2 to a tower-supported directive receiver antenna 3. A representative main radiation pattern for transmitter antenna 1 is illustrated by the lobe 4 centered on path 2. It will be understood by those skilled in the art that path 2 and the radiation pattern 4 may be moved up or down or simultaneously or otherwise distorted in curvilinear manner by well known atmospheric ducting and other effects, path 2 and pattern 4 being shown in a symmetric manner merely as a matter of convenience in the drawing.

The transmitting pattern 4 of antenna 1 and the receptivity pattern (not shown) of receiver antenna 3 must be of such angular extent that actual communication is always achieved in spite of prevailing atmospheric or ionospheric conditions, such as thermal gradients which when present tend to bend path 2 and to distort both of the radiation patterns. As a consequence, for separations between antennas 1 and 3 great enough to be economically practical, there is usually present the possibility of one or more reflections from the earth's surface 5, such as represented by the idealized path 6 reflected from the earth's surface 5 at the incidence point or area 7. Reflections from the sky are also readily possible, as from discontinuities formed by layering in the atmosphere or by aircraft. For example, the idealized path 8 is represented as being reflected by a discontinuity or surface 9 in the air into receiver antenna 3. Again, paths such as path 8 are not necessarily single reflection paths and they will normally involve curvilinear sections. The several reflected and the normal paths being of different lengths, there are of necessity circumstances under which the vector sum of all arriving signals is substantially zero and very severe fading or total loss of communication is the consequence.

Figure 2:
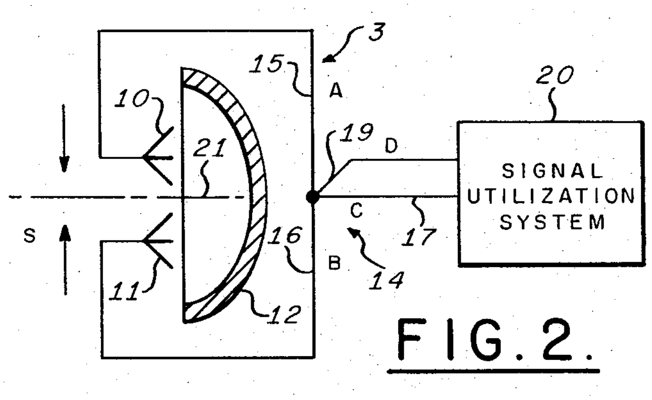
FIG. 2 is a circuit diagram of a principal embodiment of the invention.

According to the present invention, angle diversity reception is achieved by a system basically depending upon substantially simultaneous reception and processing of a signal originally transmitted as a single intelligence-modulated carrier signal and received by a pair of relatively closely spaced antenna reception elements 10 and 11 placed adjacent the focal region of a single collimating reflector, such as paraboloid reflector 12 of FIG. 2. It is understood that elements 10 and 11 are supported in fixed relation with respect to reflector 12 on a receiver antenna tower.

Figure 3:
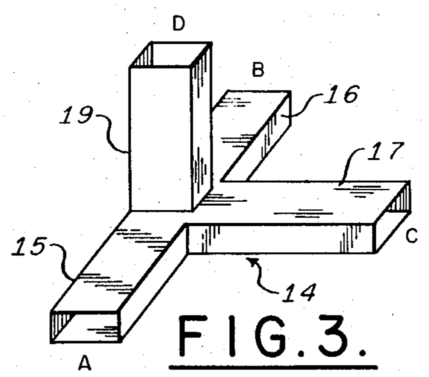
FIG. 3 is a perspective view of a typical hybrid network such as may be employed in the apparatus of FIG. 2.

Antenna reception elements 10, 11 are respectively connected to one of the input ports or arms 15, 16 of a conventional high frequency hybrid circuit 14 shown physically in FIG. 3. The A signal supplied to port 15 is collected by reception element 10, while the B signal supplied to port 16 is collected by reception element 11. Sum and difference signals are derived by hybrid circuit 14 in the usual manner.

The hybrid circuit 14 is a four-port device having output ports or arms 17 and 19 for supplying the respective signals C and D. When signals A and B of equal amplitude and phase are applied to input ports 15 and 16 of hybrid circuit 14, the entire output C (the sum A plus B) appears at port 17 for application in the instance of FIG. 2 to a signal utilization system 20. If there is a difference in amplitude and/or phase between signals A and B, the vector difference signal D appears at the differential port 19. In the instance of FIG. 2, signal D is also applied to signal utilization system 20 as will be further explained.

Figure 4:
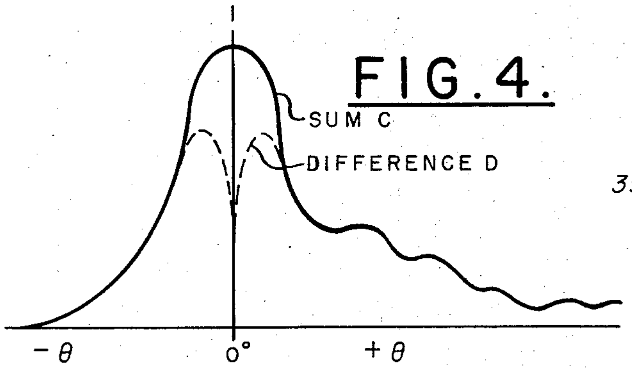
FIG. 4 is a graph useful in explaining the operation of the invention.

Referring to FIG. 4, when a planar phase front normal to the axis of symmetry 21 of the receiver antenna system 3 arrives, signals A and B of equal magnitude and of the same phase are supplied in ports 15 and 16 of hybrid circuit 14. The sum signal C of FIG. 4 appears at output port 17. On the other hand, a planar phase front arriving at some angle $\theta$ with respect to the foregoing phase front results in a phase difference between the A and B signals of $S/\lambda \sin \theta$, where $S$ is the distance between receiver elements 10, 11 and $\lambda$ is the signal wave length. The output D of FIG. 4 must be produced at the differential port 19 of hybrid 14. It is to be observed that the sum signal C is characterized by a maximum at the angle $\theta$ equal to 0°, while the difference signal D is characterized by a null at $\theta$ equals 0° in the above circumstances.

Because antenna receiver elements 10, 11, hybrid circuit 14, and their associated high frequency devices are all linear devices, the conventional laws of superposition hold. Consequently, two planar phase fronts arriving, for example, from different and finite angles $\theta$ can supply to signal C in the sum port 17 if they have equal amplitudes and opposite phases. Further, these same planar phase front waves may produce a null in the differential port 19 only by arriving from angles symmetric with respect to the axis 21 of antenna system 3, which is not a likely event.

Examination of other possible combinations of angles of arrival $\theta$ re-enforces the conclusion that the sum and difference signals have a very low possibility of simultaneous fading. Consequently, a diversity signal translator system selecting the best signal from the sum or the difference ports 17, 19 has a low probability of deep fading. Such a system additionally requires only one reflector and antenna receiver element combination, requiring no more antenna area or tower height than a non-diversity system.

Figure 5:
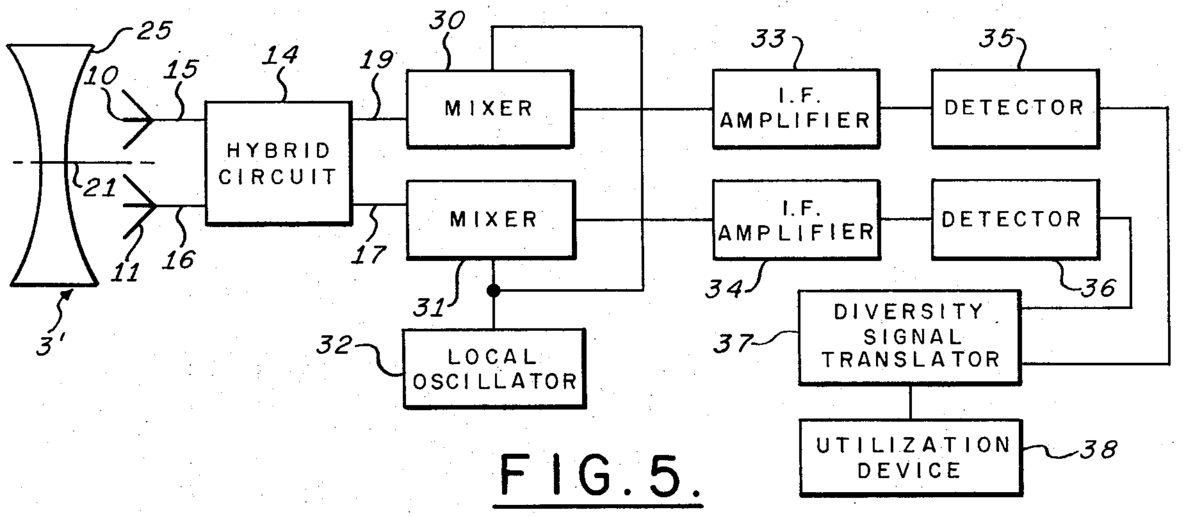
FIG. 5 is a block diagram of a further embodiment of the invention, showing the electrical interconnections of its major parts.

FIG. 5 represents one preferred form of the invention wherein the system is represented as employing the above mentioned antenna receiver elements 10, 11 and hybrid circuit 14, the elements 10, 11 using a standard high frequency loaded wave guide or other lens 25 as an energy collimator. In this system, the respective sum and differential ports 17, 19 are respectively coupled to conventional multi-port signal mixers 30, 31. Mixers 30, 31 are additionally fed with signals from a common local oscillator 32, so that the mixers supply heterodyned intermediate frequency sum and differential signals to respective intermediate frequency amplifiers 33, 34, if amplification is required. The amplitudes of the sum and differential intermediate frequency signals are derived in detectors 35 and 36 and are supplied to a conventional diversity signal translator in the form of a selector or combiner 37. Translator 37 may operate to select the respective output of detectors 35, 36 which is largest or which has the largest signal-to-noise ratio for application to conventional utilization equipment 38.

Figure 5A:
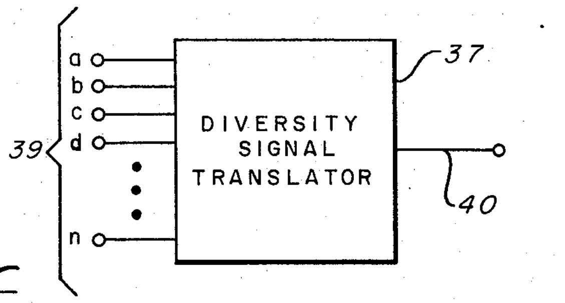
FIG. 5*a* is a block diagram of the diversity signal translator of FIG. 5.

It will be understood that the phrase diversity signal translator is intended herein to encompass certain known types of signal combining apparatus previously used in the art of diversity communication, as well as the novel arrangements taught herein. Accordingly, as in FIG. 5*a*, a diversity signal translator 37 may be equipped with *n* input leads 39 for processing *a*, *b*, *c*, *d*, . . . , *n* input signals and will have one output lead 40. It is characteristic of the diversity signal translator that at least the largest of input signals *a*, *b c*, *d*, . . . , *n* will appear on output lead 40. It is seen that the diversity signal translator 37 of FIG. 5*a* may be a true combiner in the form of a conventional resistive or other summation network which accepts inputs *a*, *b*, *c*, *d*, . . . , *n* and translates their summation $a+b+c+d+\ldots+n$ to output lead 40. On the other hand, it will be seen that the diversity signal translator 37 of FIG. 5*a* may be a selective device, as will be discussed, which automatically selects the largest signal or the signal with the best signal-to-noise ratio for translation on output lead 40. In either case, if signal *a* is the largest input signal, the diversity signal translator 37 is always responsive at its output at least to the largest of signals, a, b, c, d, . . ., *n* i.e., to signal *a*.

Figure 6:
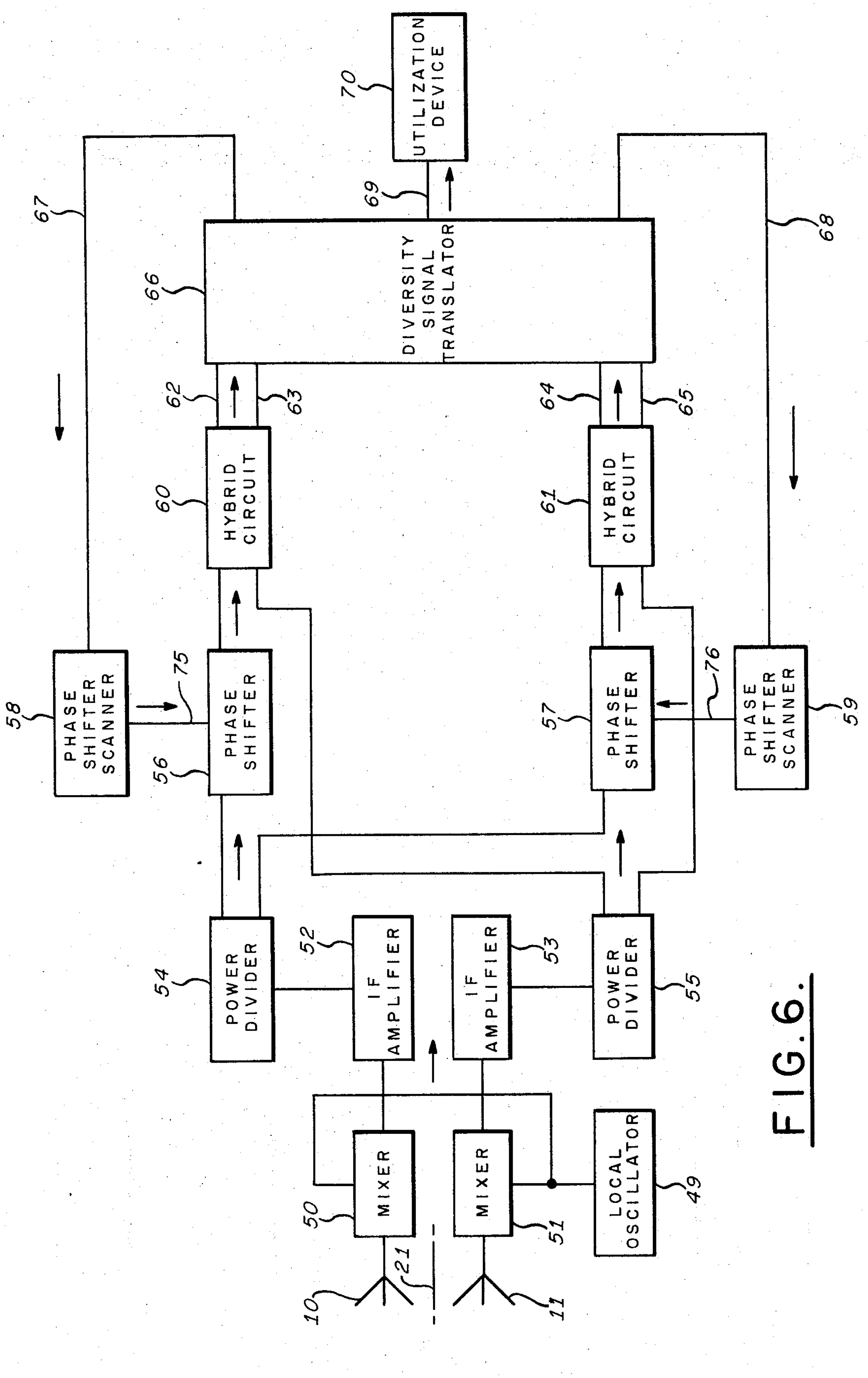
FIG. 6 is a block diagram similar to FIG. 5 illustrating an additional form of the invention.

In the system of FIG. 6, additional desirable properties of the basic concept of FIG. 4 are advantageously employed. In the apparatus of FIG. 6, the effective axis 21 of symmetry of the receiver antenna system is electronically steered to enhance reception of the signal identified by the signal diversity translator 37 as the best signal. Hybrid circuit processing of the received signals is accomplished in an alternative manner at the intermediate frequency rather than at the carrier high frequency as in FIGS. 2 and 5. In FIG. 6, it is understood that a single reflector or other collimator will be used with receiver antenna elements 10, 11, as in FIGS. 2 or 5.

In FIG. 6, the respective receiver elements 10, 11 are coupled to conventional high frequency mixers 50, 51, served by a common local oscillator 49 for producing intermediate frequency signals fed, in turn, to the respective intermediate frequency amplifiers 52 and 53. The output of amplifier 52 is fed to a conventional power divider 54 having two output ports, while the output of amplifier 53 is fed to a similar power divider 55 also having two output ports.

A first output of power divider 54 is fed through the conventional mechanically or electrically alterable phase shifter 56 to a first input of a four-port intermediate frequency hybrid circuit 60, while a first output of power divider 55 is fed directly to a second input of hybrid circuit 60. In a similar manner, a second output of power divider 54 is fed through the conventional mechanically or electrically alterable phase shifter 57 to a first input of four-port intermediate frequency hybrid circuit 61, while a second output of power divider 55 is fed directly to a second input of hybrid circuit 61.

The respective sum and difference outputs of hybrid circuits 60, 61 may be detected within signal diversity translator 66 by detectors operating in a manner similar to that of detectors 35 and 36 of FIG. 5. Diversity selector or combiner 66 may otherwise be a conventional device employed to select the best of the four signals submitted to it via leads 62, 63, 64, 65 for supply to utilization device 70 via output lead 69.

Figure 7:
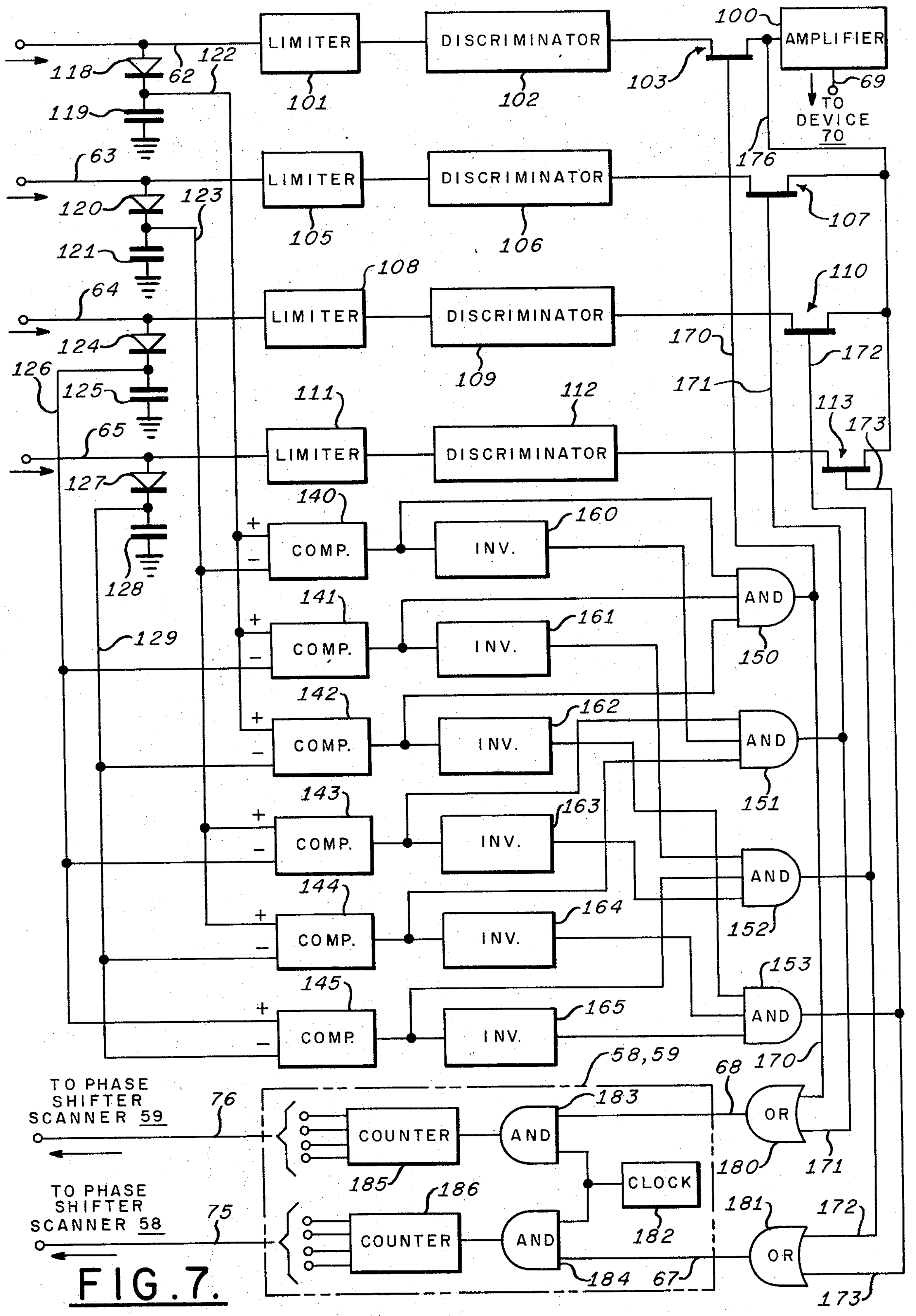
FIG. 7 is a detailed wiring diagram of the diversity translator used in the embodiment of FIG. 6.

Diversity selector or combiner 66, as will be described, may have added to it in a novel manner features permitting steering of the effective axis of symmetry of the antenna system by supplying appropriate control signals to phase shifters 56 and 57 respectively via leads 67 and 68 and the respective phase shifter scanners 58 and 59. The selector or combiner 66 may, for instance, have selected momentarily one output of hydbrid circuit 60 as the best signal to provide as an output on lead 69. In this circumstance, the combiner control signal on output lead 68 may cause phase shift scanner 59 to operate, altering the setting of phase shifter 57. If this readjustment results in a better signal-to-noise ratio than characterizes either the sum or difference signals respectively on output leads 62, 63 of hybrid circuit 60, the translator 66 permits one output of hybrid circuit 61 to be used, while the phase shifter scanner 58 and phase shifter 56 are commanded to scan for a setting yielding an even higher output from hybrid 60. Thus, the system tracks the signal on one of leads 62, 63, 64, 65 having the best signal-to-noise characteristics.

Where the novel apparatus is to include the antenna steering phase shifters 56 and 57, the diversity translator and phase shifter scanner circuits may take the form shown in FIG. 7. The input signals to the FIG. 7 apparatus are those appearing on the output leads 62, 63 of hybrid circuit 60 and on the output leads 64, 65 of hybrid circuit 61 of FIG. 6. In FIG. 7, it is assumed that the microwave relay is handling analog frequency modulated signals. The leads 62, 63, 64, 65 are to be selectively coupled through amplifier 100 and output lead 69 to the utilization device 70 of FIG. 6.

For example, the frequency modulated signal on lead 62 may be supplied through the conventional frequency modulation limiter 101 and a conventional frequency modulation discriminator 102 before passing through gate 103 to amplifier 100. Gate 103 may be a field effect transistor switch of the 2N2608 variety and is made conducting by apparatus yet to be described should the signal on lead 62 be selected as the best of the signals on leads 62, 63, 64, 65. Signals on lead 63 may reach amplifier 100 through limiter 105 and discriminator 106 if gate 107 is conducting. Signals on lead 64 may reach amplifier 100 through limiter 108 and discriminator 109 if gate 110 is conducting. Similarly, signals on lead 65 reach amplifier 100 through limiter 111 and discriminator 112 if gate 113 is conducting.

The amplitudes of the signals on the respective leads 62, 63, 64, 65 are respectively measured by suitable detector circuits such as the series circuit branching from lead 62 including diode 118 and the grounded capacitor 119. The amplitude signal is derived on lead 122 coupled to the common junction between diode 118 and capacitor 119. Similar circuits are used for deriving amplitude measures of the signals on input leads 63, 64, and 65 as, for instance, that involving input lead 63, diode 120, capacitor 121, and output lead 123. Input lead 64 uses a similar circuit involving diode 124, capacitor 125, and output lead 126. Input lead 65 operates for the purpose with diode 127, capacitor 128, and output lead 129. Operation of these circuits depends upon the fact that the largest amplitude frequency modulated signal of those on leads 62, 63, 64, 65 may be discovered by use of the outputs of diodes 118, 120, 124, and 127 in a series of voltage comparators 140 through 145. Further, it is found that the best signal-to-noise ratio can be expected on the lead 62, 63, 64, 65 having the largest amplitude intermediate frequency signal.

Voltage comparators 140 through 145 each have two input connections. Comparator 140 is connected to leads 122, 123, comparator 141 to leads 122, 126, comparator 142 to leads 122, 129, comparator 143 to leads 123, 126, comparator 144 to leads 123, 129, and comparator 145 to leads 126, 129.

Each of voltage comparators 140 through 145 is coupled directly and after inversion to particular inputs of four conventional AND or coincidence gates 150, 151, 152, 153. The AND gate 150 receives univerted inputs from comparators 140, 141, 142. The AND gate 151 receives a direct input from comparator 143, an inverted (160) input from comparator 140, and a direct input from comparator 144. The AND gate 152 receives an inverted (161) input from comparator 141, a direct input from comparator 145, and an inverted (163) input from comparator 143. Finally, the AND gate 153 is connected to receive an inverted (162) input from comparator 142, an inverted (164) input from comparator 144, and an inverted (165) input from comparator 145.

It is also seen that any output from AND gate 150 is supplied via lead 170 to cause transistor gate 103 to conduct. Similarly, an output from AND gate 151 passes via lead 171 to cause transistor gate 107 to conduct, an output from AND gate 152 passes via lead 172 to cause transistor gate 110 to conduct, and an output from AND gate 153 is passed through lead 173 to cause transistor gate 113 to conduct. When a particular one of transistor gates 103, 107, 110, 113 is conducting, a corresponding one of the signals input on leads 62, 63, 64, 65 is passed through output amplifier 100 to utilization device 70.

Operation of the apparatus of FIG. 7 as thus far described may be explained by arbitrarily designating the amplitude of the intermediate frequency signal on input lead 62 as S62. Similarly, let the signal on lead 63 be S63, on lead 64 be S64, on 65 be S65, and on 66 be S66. These input signals S62, S63, S64, and S65 are compared to each other using the connection polarizations indicated in the figure and the results of the comparisons are logically combined by the series of AND or coincidence gates 150, 151, 152, 153. With the connections as illustrated, transistor gate 103 is rendered conducting only when S62 > S63, S62 > S64, and S62 > S65. On this occurrence, the signal S62 on lead 62 is the best signal, having the highest signal-to-noise ratio, and passes through transistor gate 103 to amplifier 100, transistor gates 107, 110, and 113 remaining non-conducting.

The signal on lead 63 is deemed best and that signal is passed through transistor gate 107 and amplifier 100 when S62 < S63, S63 > S64, and S63 > S65. The signal on lead 64 is deemed best and that signal only is selected to pass through transistor gate 110 when S62 < S64, S64 < S65, and S63 < S65. The signal on lead 65 is selected as best and that signal only is selected to pass via the conducting transistor gate 113 when S62 < S65, S63 < S65, and S64 < S65.

The apparatus of FIG. 7 may be used in the invention as described in the immediately foregoing paragraphs. Should it be desired to operate phase shifters 56, 57 of FIG. 6 with that apparatus, simple additional phase shifter scanner equipment is readily added for the purpose, as shown at 58, 59 in the lower portion of FIG. 7. It is seen that leads 170, 171 and the signals on them operate upon the outputs of hybrid circuit 60 of FIG. 6, while leads 172, 173 are associated with the control of the outputs of hybrid circuit 61. A strong signal on one of leads 170, 171 identifies the fact that the signal being passed through amplifier 100 has been derived in hybrid circuit 60. On the other hand, a strong signal on one of leads 172, 173 indicates that the signal being passed through amplifier 100 was derived in hybrid circuit 61.

For controlling phase shifters 56, 57, signals on leads 170, 171 are supplied to OR gate 180 and those on leads 172, 173 to OR gate 181. Outputs from OR gates 181, 180 may be passed out of the diversity translator or combiner 66 on the respective leads 67, 68 to the respective phase shifter scanners 58, 59. Scanners 58, 59 may be considered to contain the other elements of FIG. 7 about to be discussed.

Scanners 58, 59 include a conventional binary clock 182 operating, for example, at a frequency of 10 kilocycles per second. Clock 182 supplies pulse signals to first inputs of AND or coincidence gates 183, 184. The second input to AND gate 183 is supplied via lead 68 from OR gate 180. Similarly, the second input to AND gate 184 is supplied via lead 67 from OR gate 181. The outputs of AND gates 183, 184 are respectively coupled to conventional counter circuits 185, 186. Each of these counters is of the type which supplies conventional control pulse signals from a plurality of binary counter taps (four are shown in FIG. 7 for each counter, these four leads corresponding, for example, to the single connection 75 between phase shifter scanner 58 and phase shifter 56 in FIG. 6). For example, the output from a first lead of counter 185 is adapted to shift the conventional phase shifter 57 of FIG. 6 by 8°, that from a second lead by 4°, that from a third by 2°, and that from the fourth lead by 1°. Similarly, the outputs of counter 186 are adapted to shift the output of phase shifter 56 by 8°, 4°, 2°, or 1°. It is seen that when a signal from hybrid circuit 60 of FIG. 6 is being passed to utilization device 70, phase shifter scanner 58 and phase shifter 56 are locked in a stable state and phase shifter scanner 59 causes phase shifter 57 to search for a signal of higher signal-to-noise ratio. Likewise, when a signal from hybrid circuit 61 is being passed by combiner 66 to utilization device 70, phase shifter scanner 59 and phase shifter 57 are locked in a stable state and phase shifter scanner 58 causes phase shifter 56 to search for a higher signal-to-noise ratio signal. It will be apparent to those skilled. in the art that the phase shifter scanners 58 and 59 are substantially similar to driver circuits conventionally employed to drive digital phase shifters of types well known in the art. Other types of known incremental phase shifters and drivers may be employed in circuits 56, 57, 58, 59. Microwave transmission line phase shifters in which controlled incremental phase shifts may be made are described in the Taft et al. U.S. Pat. No. 3,355,682 for a "Latching-Type Digital Phase Shifter Employing Toroids of Gyromagnetic Material," issued Nov. 28, 1967 and in the Brown et al. U.S. Pat. No. 3,355,683 of the same title and issue date. Similar devices appear in the Heithaus U.S. Pat. No. 3,411,113 for a "Microwave Gyromagnetic Device wherein the Gyromagnetic Member Has Several Parallel Apertures Throughout its Length," issued Nov. 12, 1968 and in the Parks et al. U.S. Pat. No. 3,741,809 for a "Latching Reciprocal Ferrite Phase Shifter Having Mode Suppressing Means," issued Oct. 7, 1969. The four patents are assigned to the Sperry Rand Corporation.

The versatility of the invention is further illustrated by the fact that the antenna receiver elements 10, 11 may be spaced at wider intervals, if desired. In such an arrangement, multiple-lobe interference patterns are formed in the system sum patterns. Thus, the lobes of the two otherwise interfering sum patterns may be made to fall on each other with relative displacement so that the lobes of one pattern fall on the interference nulls of the other. Thus substantially fade free reception of the direct signal path may be afforded.

While the invention has been described in its preferred embodiments, it is to be understood that the words which have been used are words of description rather than of limitation and that changes within the purview of the appended claims may be made without departing from the true scope and spirit of the invention in its broader aspects.

I claim:

1. A communication system for receiving space-propagated electromagnetic waves subject to fading comprising:

first and second receiver antenna means cooperating with unitary electromagnetic wave collimator means for forming first and second respective signals within said first and second receiver antenna means, hybrid network means having at least first and second output port means and responsive to said first and second respective signals for forming a sum signal at said first output port means only and a difference signal at said second output port means only, diversity signal translator means responsive only to the largest in amplitude of said respective sum or difference signals for producing a translator output, and utilization means responsive to said diversity signal translator means output.

2. Apparatus as described in claim 1 wherein said first and second receiver antenna means are spaced symmetrically at the focal region of unitary collimator means for collimating said space-propagated electromagnetic waves.

3. Apparatus as described in claim 1 further including between said sum output port means and said diversity signal translator means and between said difference output port means and said diversity signal translator means respective first and second substantially similar signal converter means each comprising in series relation:

mixer means for forming an intermediate frequency signal, and detector means for detecting said intermediate frequency signal for providing an output signal substantially proportional in amplitude to the amplitude of said intermediate frequency signal.

4. A communication system for receiving space-propagated electromagnetic waves subject to fading comprising:

first and second receiver antenna means cooperating with unitary electromagnetic wave collimator means for forming first and second respective signals within said first and second receiver antenna means, first hybrid network means having first and second output port means and responsive to said first and second respective signals for forming a first sum signal at said first output port means only and a first difference signal at said second output port means only, second hybrid network means having third and fourth output port means and responsive to said first and second respective signals for forming a second sum signal at said third output port means and a second difference signal at said fourth output port means, diversity signal translator means responsive only to the largest in amplitude of said respective first or second sum or first or second difference signals for producing a translator output, and utilization means responsive to said diversity signal translator means output.

5. Apparatus as described in claim 4 further including between said first receiver antenna means and said first hybrid network means and said second receiver antenna means and said second hybrid network means respective substantially similar third and fourth signal converter means each comprising in series relation:

mixer means for forming an intermediate frequency signal, and power divider means responsive to said mixer means.

6. Apparatus as described in claim 5 wherein said signal diversity translator means is responsive to said sum or difference output port means of said first or second four-port hybrid network means.

7. A communication system for receiving space-propagated electromagnetic waves subject to fading comprising:

first and second receiver antenna means for receiving said waves and forming first and second discrete signals, first and second mixer means respectively responsive to said first and second discrete signals for forming first and second intermediate frequency signals, first and second power divider means respectively responsive to said first and second mixer means, first and second four-port hybrid network means responsive to said first and second power divider means for developing, at said four separate hybrid network output port means, respective first and second sum and first and second difference signals, first and second phase shifter means respectively series coupled between the first of said power divider means and said first and second four-port hybrid networks means, diversity signal translator means responsive only to the largest in amplitude of said first or second sum or first or second difference signals for producing an output, and utilization means responsive to said diversity signal translator means output.

8. Apparatus as described in claim 7 wherein said diversity signal translator means passes the largest in amplitude of the signals at said sum or difference output port means of said first and second four-port hybrid network means to said utilization means.

9. Apparatus as described in claim 8 wherein said diversity signal translator means holds constant the phase shift of the one of said first or second phase shifter means through which said largest in amplitude signal is passing.

10. Apparatus as described in claim 9 wherein said diversity signal translator means changes the phase shift of the one of said first or second phase shifter means through which signals are passing of amplitude lesser than said largest in amplitude signal.

11. Apparatus as described in claim 10 wherein said diversity signal translator means includes plural channel means each comprising:

limiter means, frequency modulation discriminator means responsive to said limiter means, and gate means responsive to said discriminator means for passing a version of said largest in amplitude signal to said utilization means.

12. Apparatus as described in claim 11 wherein said diversity signal translator means includes respective plural circuit means branching from the respective inputs of said limiter means of said respective plural channel means for controlling said gate means.

13. Apparatus as described in claim 12 wherein said plural circuit means includes means for detection of the amplitudes of said sum or difference signals.

14. Apparatus as described in claim 13, wherein said plural circuit means includes a plurality of comparator means for selecting the largest in amplitude of said sum or difference signals for controlling said gate means.

15. Apparatus as described in claim 13 wherein said plural circuit means includes a plurality of comparator means for selecting and changing the phase shift of the one of said first or second phase shift means through which signals are passing of amplitude lesser than said largest in amplitude signal.

* * * * *